June 5, 1934.  D. E. JOHNSON  1,961,442
TOOL HOLDER
Filed April 16, 1932
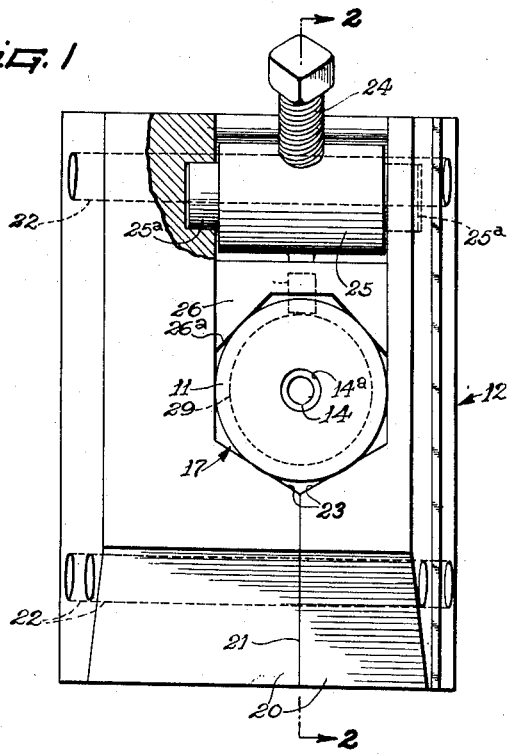
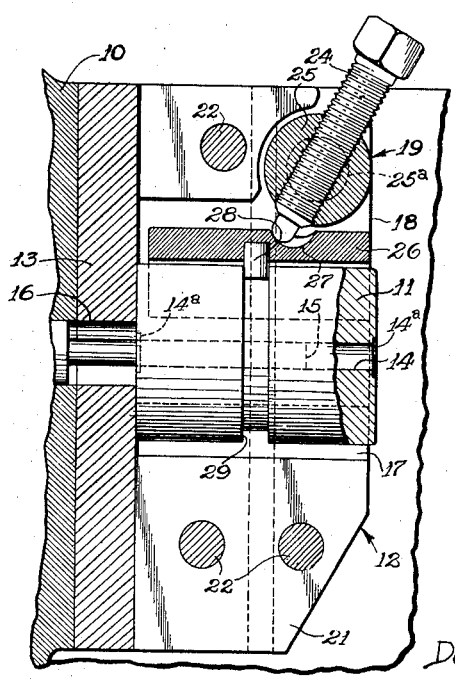
Inventor
David E. Johnson
By Churchill, Parker & Carlson
Attorneys Patented June 5, 1934

1,961,442

UNITED STATES PATENT OFFICE 1,961,442

TOOL HOLDER

David E. Johnson, Rockford, Ill.

Application April 16, 1932, Serial No. 605,625

9 Claims. (Cl. 10—24)

The invention relates generally to tool holders and more particularly to means for retaining the position of a heading die in a machine for forming heads on bolts, screws or the like. In machines constructed in accordance with prior practice, such die retaining devices have in most cases been relatively expensive to manufacture and quite difficult to mount in the machine, the mounting operation requiring an excessive amount of time.

The primary object of the present invention is to provide a retainer for a die constructed to reduce the time necessary to mount or replace a die in the machine and of such a character that it may be economically manufactured.

Another object of the invention is to provide a die retainer embodying a novel means for applying a clamping pressure to the die to hold the same in position in a retainer.

Another object is to provide a die retainer adapted for the use of a reversible die.

Other objects and advantages will become apparent from the following description taken in connection with the accompanying drawing which illustrates one form of die retainer embodying the features of the invention, and in which Figure 1 is a front elevational view of a retainer constructed in accordance with the invention.

Fig. 2 is a vertical sectional view taken along the line 2—2 of Fig. 1.

The preferred embodiment of the invention is herein illustrated in association with a fragmental portion of a heading machine having a frame 10 with a tool in the form of a die 11 removably mounted in a holder 12 with one end abutting a backing plate 13. The die 11 has a longitudinal opening 14 extending therethrough into which a work blank (not shown) may be inserted from the other or outer end of the die into contact with the end of a pin 15. The pin 15 extends through an opening 16 in the backing plate 13 and into the opening 14 so as to serve as an abutment for the inner end of the work blank. When in this position, the work blank is struck by an opposed die (not shown) which forms a head upon the work blank by upsetting the same into a die recess 14ª formed in the die about the outer end of the opening 14. The pin 15 is preferably mounted for longitudinal movement so that it may serve as a knock-out means for removing the work from the die 11.

To removably support the die 11 on the frame 10, the holder 12 is formed to provide a socket 17 extending entirely through the holder so that the die 11 may be positioned in the socket with one end in abutment with a backing plate 13 and the other end projecting a slight distance beyond the outer face 18 of the holder 12, and a clamping device 19 mounted at one side of the socket 17 acts on the die at an angle to the longitudinal axis thereof to hold the die firmly against the backing plate 13 and against the opposite side of the socket 17.

The holder 12, as herein shown, is constructed to receive a die 11 of cylindrical shape, and the holder is formed in such a manner as to permit manufacture thereof by relatively simple operations whereby to reduce its cost. To this end the holder 12 is of two-part construction embodying two blocks 20 of generally similar form with plane faces 21 abutting each other. Spaced from one end thereof, the blocks 20 are recessed in the adjacent sides so that each block 20 forms one-half of the socket 17 and the blocks are held together and in position on the machine frame by bolts 22 extending through the blocks and engaging the machine frame. Preferably the wall of the socket opposite the clamping device 19 is formed by two plane surfaces 23 formed one on each block 20 and meeting at an angle to form a seat such that the cylindrical surface of the die 11 may contact the two surfaces 23 and be accurately positioned thereby.

Manufacturing inaccuracies are rendered relatively unimportant in the present device by constructing the clamping means 19 in the nature of an expanding device pivotally associated at its opposite ends with the holder 12 and the die 11 so that a force may be applied to the die at an acute angle to the longitudinal axis thereof such that one component of the force acts to hold the die against a backing plate 13 and the other component acts to hold the die laterally in position against the seat formed by the surfaces 23.

To this end the clamping means 19 comprises a screw 24 threaded transversely through a trunnion 25, the trunnion having reduced ends 25ª journaled in the blocks 20 of the holder on opposite sides of the socket 17 for rotation about an axis which is perpendicular to a vertical plane passing through the longitudinal axis of the die 11. The trunnion 25 is preferably located adjacent to the outer side of the holder 12 so that the screw 24 may extend at an acute angle to the longitudinal axis of the die and toward the central portion of the die for applying a force to the die in a direction which will produce the desired clamping action. By reason of its acute angular relation to the backing plate and the seat provided by the surfaces 23, the screw 24 when in its operative position constitutes in effect a prop for maintaining the die 11 in abutment with the backing plate 13. The prop formed by the screw 24 is longitudinally adjustable to clamp the die firmly in place, and is shiftable about a transverse axis formed by the trunnion 25 to bring the screw into its operative relation to the die.

In order that the screw 24 may be pivotally associated with the die 11 so as to transmit the retaining force thereto, a pressure shoe 26 is preferably interposed between the end of the screw and the die 11, the shoe and the die being interlocked so that force may be transmitted longitudinally from the shoe to the die. The pivotal connection between the pressure shoe 26 and the screw 24 preferably comprises a semi-spherical seat 27 formed in the outer surface of the shoe and engaged by a rounded end formed on the screw 24. The other end of the screw 24 projects beyond the outer edges of the holder 12 so as to facilitate engagement thereof for operation of the clamping device.

The shoe 26 is connected to the die and the two held against relative longitudinal movement while being adapted to be disconnected conveniently to permit removal and replacement of the die. Herein this connection is formed by a lug in the form of a pin 28 projecting from the shoe 26 into a recess formed in the outer surface of the die. For a purpose to appear presently, the recess preferably is in the form of an annular groove 29.

With the adjustable construction above described, it will be apparent that looseness between the shoe and the die and variation in the location of the die surface engaged by the retainer will be compensated for automatically in tightening the screw 24 to clamp the die in place. For this reason, no high degree of accuracy is required in the formation of the die surface which is engaged by the retainer. Moreover, with the present construction, the retainer can be loosened and tightened readily enabling the die to be removed quickly and replaced.

By employing a die recess in the form of a groove, it will be apparent that the cylindrical die may be rotated to any desired angular position and then clamped in place. With the groove 29 located centrally of the die, the relation of the latter to its holder may be reversed at will.

The shoe 26 preferably extends for a substantial distance longitudinally of the die 11 whereby to insure firm clamping thereof, and is provided with angularly related surfaces 26a engaging the cylindrical surface of the die 11. The pin 28 is removable so as to provide for the use of the same shoe 26 with dies having various forms of recesses 29.

From the foregoing description it will be apparent that the present invention provides a die retainer with which a die may be quickly and easily clamped in place in the machine. The retainer is constructed so as to avoid the necessity for accurate formation of wedge surfaces on the die and the retaining means whereby to reduce the cost of the retaining device and the cost of the dies.

The device is particularly adapted for the use of a reversible die which may be economically produced by reason of the fact that a pressure shoe is employed to transmit the force of the clamping device to the die and the interengagement between the pressure shoe and the die may be, by means of simple form, centrally located longitudinally of the die so that the same means may be used in either position of the die.

I claim as my invention:

1. A heading machine having in combination, a holder providing a socket, a die adapted to be positioned in said socket, a backing plate at one end of said socket, and screw means pivotally mounted on said holder and operable to press the die in an endwise direction against said backing plate and laterally against one side of said socket.

2. A device of the class described comprising a holder having a socket and a backing plate for said socket, a die in said socket, and a prop swingable into operative relation to the die about an axis extending transversely of the die axis, said prop being movable longitudinally to clamp said die against one side of said socket and against said backing plate.

3. In a device of the character described, the combination of a die, a holder providing a socket for receiving said die with a seat for engagement by one side of the die, a backing plate for one end of the die, and a clamping member for securing said die against said plate and said seat, said member being mounted in said holder for pivotal and longitudinal adjustment into clamping relation to the die.

4. In a device of the character described, the combination of a die, a seat for said die comprising a backing surface adapted for abutment with one end of said die and a holder adjacent said surface providing surfaces perpendicular to said backing surface and at an angle to each other, a member pivoted on said holder to swing about an axis extending parallel to said backing surface and perpendicular to a plane including the longitudinal axis of the die, and a screw threaded into said member transversely of the axis thereof and at an angle of the die axis.

5. In a retaining device the combination of a holder, a die adapted to be positioned in said holder, an abutment to limit movement of the die in one direction longitudinally with respect to the holder, and an expansive clamping means pivotally related to and acting between said die and said holder to maintain said die against one side of said holder and against said abutment.

6. A device of the character described comprising a holder recessed to form a seat, a die having one side adapted to engage said seat, an abutment limiting longitudinal movement of the die in one direction, a trunnion mounted in said holder on the opposite side of said die and arranged to rock about an axis perpendicular to a plane including the longitudinal axis of the die, a screw threading through said trunnion transversely of its axis and adapted to act upon said die at an acute angle to the longitudinal axis of the die to clamp the die transversely against said seat and endwise against said abutment.

7. A device of the character described comprising a holder recessed to form a seat, a die having one side adapted to engage said seat, an abutment limiting longitudinal movement of the die in one direction, a trunnion mounted in said holder on the opposite side of said die and arranged to rock about an axis perpendicular to a plane including the longitudinal axis of the die, a pressure shoe adapted to engage said opposite side of the die and interlocked with the die to prevent relative longitudinal movement in one direction, a screw threaded in said trunnion transversely of the axis thereof, and pivotally engaging said shoe at a point spaced from the axis of the trunnion longitudinally of the die and operable to clamp the die transversely against said seat and endwise against said abutment.

8. The combination of a die, a holder providing a seat for engagement with the side of said die, an abutment to limit movement of the die in one direction relative to said holder, and means for applying a clamping force to press said die against said seat and said abutment including a member mounted for endwise movement toward said abutment and at different angles to the length of the die.

9. The combination of a die, a holder providing a seat for engagement with the side of said die, an abutment to limit movement of the die in one direction relative to said holder, and a screw extending at an angle to the die and pivotally mounted upon said holder to swing in a plane extending longitudinally of said die, said screw acting upon endwise movement to apply a clamping pressure urging said die against said seat and said abutment.

DAVID E. JOHNSON.